US006765369B2

(12) United States Patent
Rhee et al.

(10) Patent No.: US 6,765,369 B2
(45) Date of Patent: Jul. 20, 2004

(54) APPARATUS AND METHOD FOR MANAGING POWER OF A BATTERY

(75) Inventors: Dong-ho Rhee, Seoul (KR); Han-sung Kim, Seongnam-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 27 days.

(21) Appl. No.: 10/231,051

(22) Filed: Aug. 30, 2002

(65) Prior Publication Data

US 2003/0122524 A1 Jul. 3, 2003

(30) Foreign Application Priority Data

Dec. 29, 2001 (KR) ........................................ 2001-88232

(51) Int. Cl.[7] ........................ H01M 10/44; H01M 10/46
(52) U.S. Cl. ..................................................... 320/132
(58) Field of Search .............................. 320/127, 128, 320/132, 134, 136, 149; 323/234, 299

(56) References Cited

U.S. PATENT DOCUMENTS

| | | | |
|---|---|---|---|
| 5,175,485 A | * | 12/1992 | Joo ............................. 320/159 |
| 5,528,087 A | * | 6/1996 | Sibata et al. .................. 307/66 |
| 5,633,573 A | * | 5/1997 | van Phuoc et al. .......... 320/128 |
| 5,808,881 A | * | 9/1998 | Lee .............................. 363/37 |

FOREIGN PATENT DOCUMENTS

| | | |
|---|---|---|
| KR | 1999-3993 A | 1/1999 |
| KR | 1999-70581 A | 9/1999 |

* cited by examiner

Primary Examiner—Edward H. Tso
(74) Attorney, Agent, or Firm—Sughrue Mion, PLLC

(57) ABSTRACT

Provided are an apparatus and method for managing power, and more particularly, an apparatus and method for stably managing power by comparing a predetermined reference voltage level with a battery voltage level. The provided method for managing power includes (a) detecting the battery voltage level, which supplies power to a system after a predetermined period from the system being powered off, and comparing the battery voltage level with a reference voltage level, and (b) deciding the operation of the system in correspondence to the result of the comparison. According to the provided method, when the battery voltage level of the system is between the power off voltage level and the reference voltage level, the system is operated in the sleep mode using a minimum amount of power. When the battery voltage level is above the reference voltage level, the system is operated normally when a power switch is turned on. Consequently, the power and system are stably managed.

5 Claims, 3 Drawing Sheets

APPARATUS AND METHOD FOR MANAGING POWER OF A BATTERY

BACKGROUND OF THE INVENTION

1. Field of the Invention

The present invention relates to an apparatus and method for managing power, and more particularly, to an apparatus and method for stably managing power by comparing a predetermined reference voltage level with a battery voltage level. The present application is based on Korean Patent Application No. 2001-88232, which is incorporated herein by reference.

2. Description of the Related Art

A conventional system using a battery manages power by turning off the system when the voltage level of the battery drops below a predetermined voltage level. In the case where a system driven by the battery, e.g., a mobile telephone, is used continuously, when the battery voltage level drops below the predetermined voltage level, the system turns off. However, when detecting the battery voltage level after a specific period, the battery voltage level often returns to a level higher than the power off level.

Therefore, the conventional method for managing power repeatedly turns the power on and off because, after power-off the voltage level reaches a level higher than the power off level and power is turned on, but after a short period the voltage drops below the power off level and power is turned off. The power-on and power-off operations are repeated until the battery power is completely drained. This phenomenon may cause system failure or a fatal system defect.

SUMMARY OF THE INVENTION

To solve the above-described problems, it is an objective of the present invention to provide an apparatus for managing power, where a reference voltage level for managing battery power is established and the established reference voltage level is compared to the battery power, thereby stably managing the battery power by using the result of comparison.

It is another objective of the present invention to provide a method for managing power, where a reference voltage level for managing battery power is established and the established reference voltage level is compared to the battery voltage level to stably manage the battery power by using the result of the comparison.

To accomplish the above objective of the present invention, an apparatus for managing power includes a power control unit for detecting a battery voltage level of a battery, which supplies power to a system, after a predetermined period from powering off the system and for comparing the detected result with a reference voltage level so as to determine the supply of power to the system, and a power switching unit for operating the system in a normal mode when the battery voltage level is above the reference voltage level.

It is preferable that the power control unit outputs a signal for operating the system in a sleep mode in a case where the detected battery voltage level is between a power off voltage level and the reference voltage level.

To accomplish another objective of the present invention, a method for managing power includes (a) detecting a battery voltage level of a battery, which supplies power to a system after a predetermined period from powering off the system, and comparing the battery voltage level with a reference voltage level, and (b) deciding the operation of the system in correspondence to the result of the comparison.

It is preferable that if the detected battery voltage level is between a power off voltage level and the reference voltage level, the system is operated in a sleep mode. It is preferable that if the detected battery voltage level is above the reference voltage level, a switch for operating the system is turned on, thereby normally operating the system.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
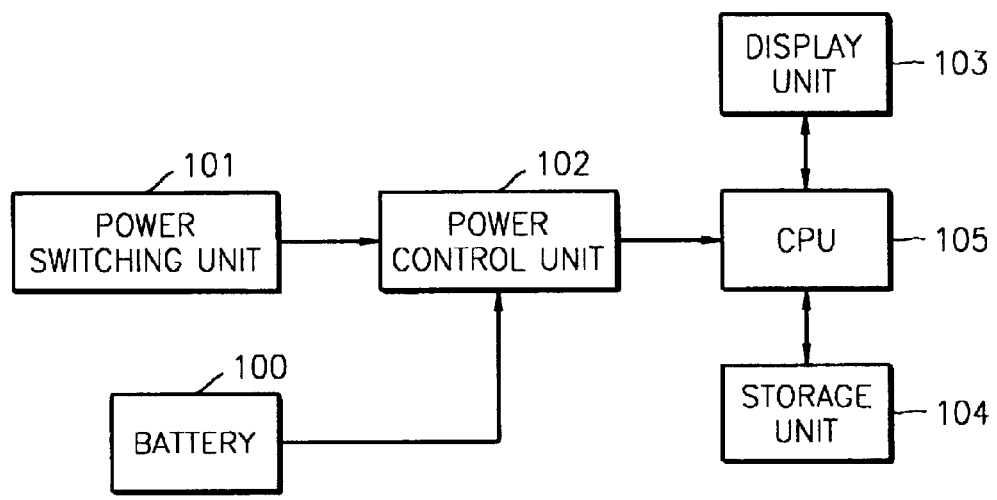
FIG. 1 is a block diagram illustrating the structure of an apparatus for managing power, according to the present invention.

FIG. 1 is a block diagram illustrating the structure of an apparatus for managing power according to the present invention. The apparatus for managing power includes a battery 100, a power switching unit 101, a power control unit 102, a display unit 103, a storage unit 104, and a central processing unit (CPU) 105.

Figure 2:
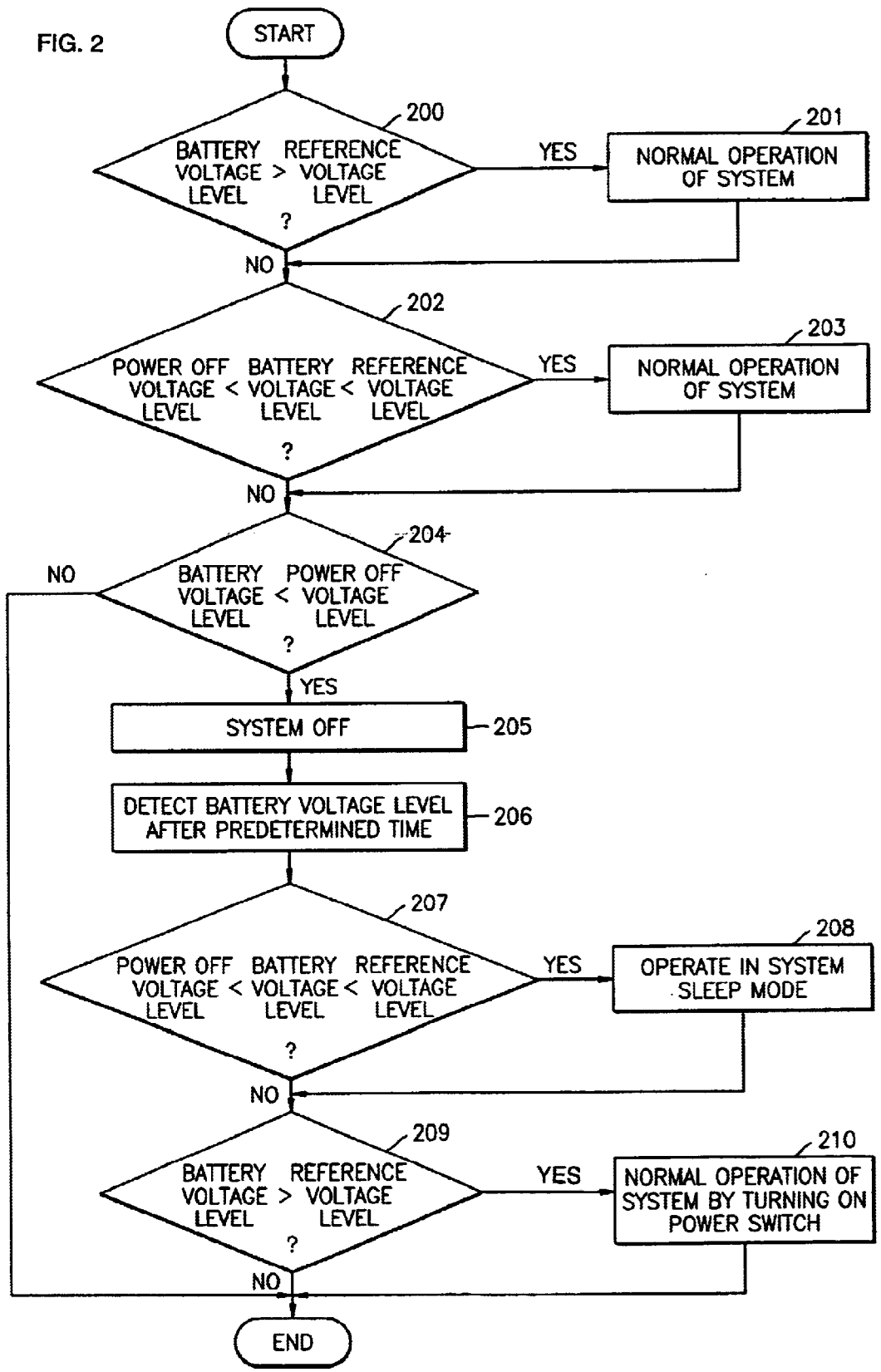
FIG. 2 is a flowchart illustrating a method for managing power according to the present invention.

FIG. 2 is a flowchart illustrating the operation of a method for managing power according to present invention. The method includes deciding if a battery voltage level is above a reference voltage level in step 200, normally operating a system in step 201, deciding if the battery voltage level is above a power off voltage level and below the reference voltage level in step 202, normally operating the system in step 203, deciding if the battery voltage level is below the power off voltage level in step 204, turning off the power of the system in step 205, detecting the battery voltage level again after a predetermined period of time in step 206, deciding if the battery voltage level is above the power off voltage level and below the reference voltage level in step 207, operating the system in the sleep mode in step 208, deciding if the battery voltage level is above the reference voltage level in step 209, and normally operating the system by turning a power switch on in step 210.

Figure 3:
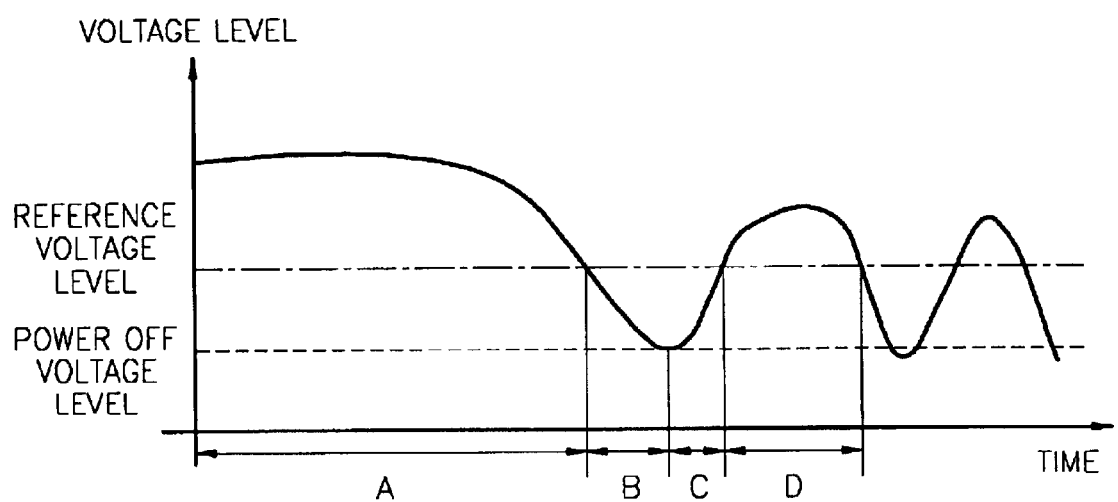
FIG. 3 illustrates a waveform of discharge curve of a battery of FIG. 1.

FIG. 3 illustrates a waveform of discharge curve of a battery of FIG. 1.

The present invention will be described in greater detail with reference to FIGS. 1 and 3.

The battery 100 supplies power to a system. The power switching unit 101 is used to normally operate the system a predetermined period of time after a system is turned off. The power control unit 102 compares the battery voltage level, which is detected after the predetermined period of time from turning off the system power, with a reference voltage level so as to determine the operation of the system from the result of the comparison. When the detected battery voltage level is above a system off voltage level, which turns off the system, and below the reference voltage level, the system operates in a sleep mode. In the sleep mode, only a real time clock (RTC) and a DRAM refresh operate. In the case where the battery voltage level is above that of the reference voltage level, the system is operated normally in correspondence to the input of the power switching unit 101, which operates the system.

The power control unit 102 decides if the battery voltage level is above the voltage level of the reference voltage level and reports the normal operation of the system to a CPU 105 if the battery voltage level is above the reference voltage level, in steps 200 and 201. In this case, the battery 100 is in a sufficiently charged state.

The power control unit 102 decides if the battery voltage level is between the power off voltage level and the reference voltage level to report the normal operation of the system to the CPU 105 according to the battery voltage level above the power off voltage level and below the reference voltage level, in steps 202 and 203. In this case, the battery 100 is discharged a bit; however, the battery voltage level is above the power off voltage level, thereby normally operating the system.

The power control unit 102 decides if the battery voltage level is below the power off voltage level for outputting a power off signal of the system to the CPU 105 in the case of the battery voltage level below the power off voltage level in steps 204 and 205. The CPU 105 turns off the power of the system in correspondence to the power off signal from the power control unit 102.

After the predetermined period from turning off the power of the system passes, the voltage control unit 102 detects the battery voltage level again in step 206.

The power control unit 102 decides if the battery voltage level is above the power off voltage level and below the reference voltage level for reporting the status of the battery voltage level, which is between the power off voltage level and the reference voltage level, to the CPU 105. The CPU 105 operates the system in the sleep mode.

The power control unit 102 decides if the battery voltage level is above the reference voltage level. In the case where the battery voltage level is above the reference voltage level, the system is operated normally according to turn-on of the power switching unit 101 in steps 209 and 210.

FIG. 3 illustrates the waveform of a discharge curve of the battery 100 according to passage of time. Referring to FIG. 3, the battery voltage level is greater than the reference voltage level in section A where the system is operated normally. The battery voltage level is between the power off voltage level and the reference voltage level in section B where the system is operated normally in correspondence to the generation of the reference voltage level. In the case where the battery voltage level is less than the power off voltage level, the power of the system is turned off. If the battery voltage level is detected after the predetermined period from turning off the power of the system lapses, the battery voltage level forms sections C and D. In section C, the battery voltage level is between the power off voltage level and the reference voltage level for operating only the RTC and the DRAM refresh, not the power switching unit 101. In this case, the CPU 105 is in the sleep mode. In section D, the battery voltage level is above the reference voltage level for normally operating the system. In this case, only the RTC and the DRAM refresh are operated until the power switching unit 101 is input. When the power switching unit 101 is input, the system is operated normally.

The present invention is not limited to the preferred embodiment described above, and it is apparent that variations and modifications by those skilled in the art can be effected within the spirit and scope of the present invention as defined in the appended claims.

According to the present invention, when the battery voltage level of the system is between the power off voltage level and the reference voltage level, the system is operated in the sleep mode using a minimum amount of power. When the battery voltage level is above the reference voltage level, the system is operated normally when a power switch is turned on. Consequently, the power and system are stably managed.

What is claimed is:

1. An apparatus for managing power comprises:
    a power control unit for detecting a battery voltage level of a battery and establishing a detected result, which supplies power to a system, after a predetermined period from powering off the system and for comparing the detected result with a reference voltage level so as to determine the supply of power to the system; and
    a power switching unit for operating the system in a normal mode when the battery voltage level is above the reference voltage level,
    wherein the system is also operated in the normal mode when the battery voltage level falls from the reference voltage level towards a power off voltage level, and the system is operated in a sleep mode when the battery voltage increases from the power off voltage level to the reference voltage level.

2. The apparatus of claim 1 for managing power, wherein in sleep mode, only a real time clock and a DRAM refresh operate.

3. A method for managing power comprises:
    (a) detecting a battery voltage level of a battery, which supplies power to a system after a predetermined period from powering off the system, and comparing the battery voltage level with a reference voltage level; and
    (b) deciding the operation of the system in correspondence to the result of the comparison,
    wherein if the detected battery voltage level is increasing from a power off voltage level to a reference voltage level, the system is operated in a sleep mode, and if the detected battery voltage level is decreasing from the reference voltage level to the power off voltage level, the system is operated in a normal mode.

4. The method for managing power of claim 3, wherein if the detected battery voltage level is above the reference voltage level, a switch for operating the system is turned on, thereby normally operating the system.

5. The method for managing power of claim 3, wherein in sleep mode, only a real time clock and a DRAM refresh operate.

* * * * *